July 9, 1963  E. N. COLE ETAL  3,096,938
HEATING AND VENTILATING SYSTEM FOR AIR COOLED ENGINE CARS
Filed Sept. 2, 1960  2 Sheets-Sheet 1
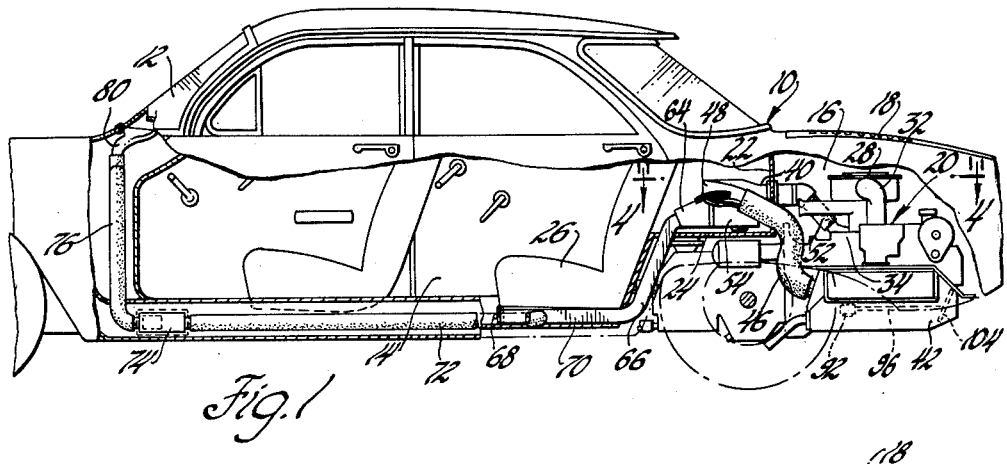
INVENTORS
Edward N. Cole, &
BY Rodney M. Johnston
George E. Johnson
ATTORNEY

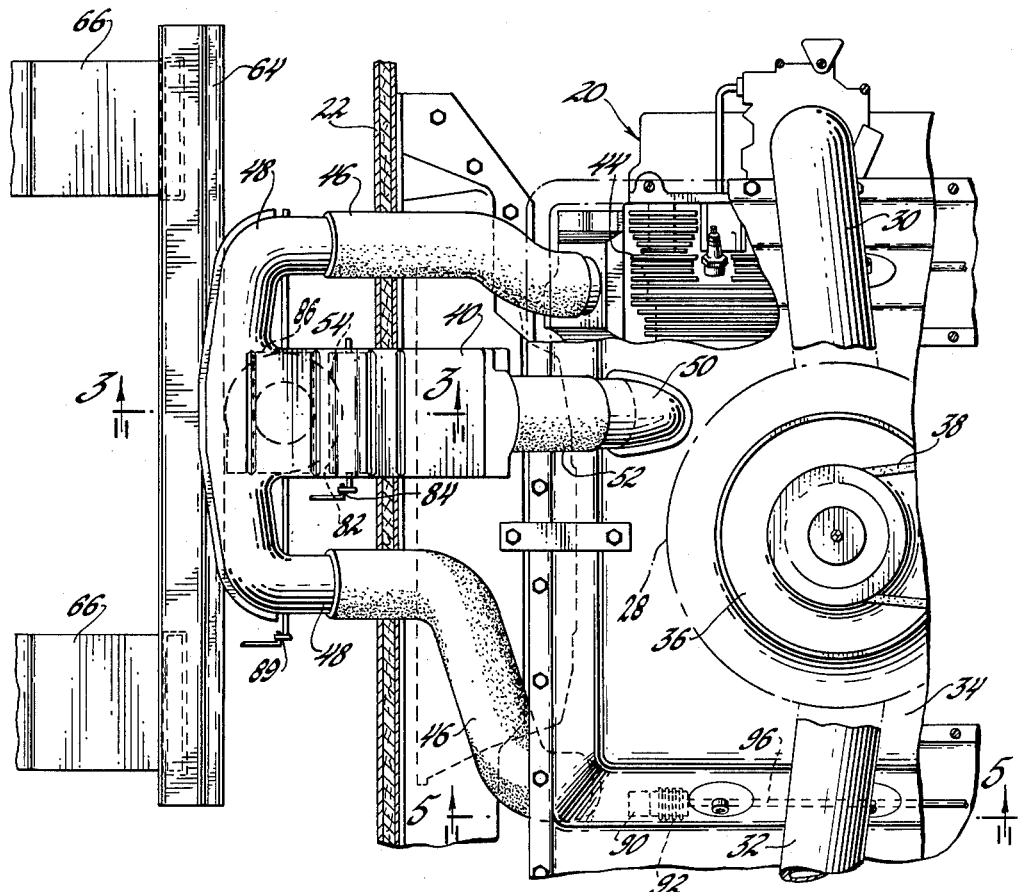
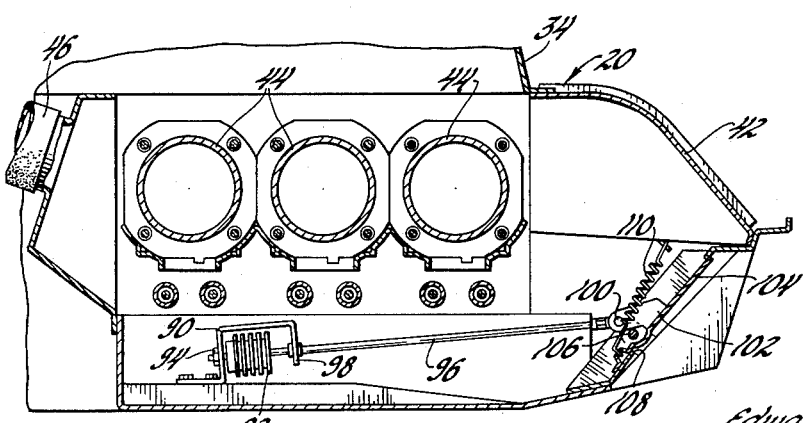
Fig. 4
Fig. 5
INVENTORS
Edward N. Cole &
BY Rodney M. Johnston
George E. Johnson
ATTORNEY

United States Patent Office 3,096,938
Patented July 9, 1963

3,096,938
HEATING AND VENTILATING SYSTEM FOR
AIR COOLED ENGINE CARS
Edward N. Cole, Bloomfield Hills, Mich., and Rodney M.
Johnston, Lockport, N.Y., assignors to General Motors
Corporation, Detroit, Mich., a corporation of Delaware
Filed Sept. 2, 1960, Ser. No. 53,797
3 Claims. (Cl. 237—12.3)

This invention relates to heating and ventilating systems for cars and more particularly to systems for heating and ventilating the passenger compartments of automobiles powered by air cooled engines.

Air cooled automobile engines gives off considerable heat through their cylinder walls and obviously it is advantageous to utilize this otherwise wasted heat as effectively as possible. Some of this heat could be used to prevent carburetor icing and to preheat combustion air. There is sufficient waste heat given off by the engine exclusive of the muffler or exhaust system to also heat the passenger compartment if duct work is designed properly to convey the available heat without undue loss to the ambient air. Preferably this same duct work should be usable for ventilating the passenger compartment when heat is not required.

An object of the present invention is to provide an improved heating and ventilating system by means of which heat necessarily transferred to engine cooling air may be directed into a passenger compartment for heating the latter. Another object is to provide a heating and ventilating system using air for maintaining a proper operating temperature for an air cooled engine of a vehicle and for conveying heat to a passenger compartment of that vehicle or to the vehicle exterior as occasion demands.

A feature of the present invention is a heating system employing an engine cooling or main blower and an auxiliary or second blower with duct work controlled by dampers to direct heated or relatively cool air from an engine or compartment to a passenger compartment of a vehicle. Another feature comprises means giving thermostatic control of the temperature of air surrounding and contacting the cylinder walls of an air cooled automobile engine in heat exchange relation to effect heating of a passenger compartment and to improve engine operating efficiency. Another feature is a thermostatic control of the temperature of engine cooling air to maintain optimum engine efficiency whether passenger compartment heating is or is not required under conditions encountered.

These and other important features of the invention will now be described in detail in the specification and then pointed out more particularly in the appended claims.

In the drawings:

FIGURE 1 is a view in elevation of a rear engine type automobile, parts being broken away better to illustrate a heating and ventilating system as one embodiment of the present invention;

FIGURE 2 is a phantom perspective view of the automobile shown in FIGURE 1, the heating and ventilating system being shown in full lines;

FIGURE 3 is an enlarged sectional view of structural details as seen looking in the direction of the arrows 3—3 in FIGURE 4;

FIGURE 4 is an enlarged sectional view showing system details looking in the directions of the arrows 4—4 in FIGURE 1, parts of the engine being broken away and an engine combustion air cleaner being omitted; and FIGURE 5 is a sectional view looking in the direction of the arrows 5—5 in FIGURE 4 and showing one bank of cylinders.

The drawings illustrate the invention as utilized in a rear engine automobile 10 of a type in common use. An air cooled engine for such use is disclosed in the United States patent application Serial No. 843,736, filed October 1, 1959, now Patent No. 2,972,340 in the name of Joseph F. Bertsch and entitled, "Cooling and Air Supply System For Internal Combustion Engines." This engine comprises six cylinders with their axes lying in a horizontal plane with three cylinders in each of two opposed banks. A blower is mounted on top of the engine and is driven thereby to force cooling air downwardly and around the finned walls of the six separate cylinders to cool them. Many details of the engine are not fully disclosed herein as they form no part of the present invention and the latter could be used in combination with other types of air cooled engines mounted either in the back or front portions of vehicles.

The automobile 10 includes a windshield 12, a passenger compartment 14 and a rear engine compartment 16. The latter is partially defined by a louvered cover 18 through which air may be admitted to the air cooled engine generally indicated at 20. A partition 22 separates the passenger compartment 14 from the engine compartment 16. This partition has a horizontal portion or shelf 24 located immediately to the rear of the back seat 26.

An engine combustion air cleaner 28 is shown in FIGURE 1. This cleaner forms no part of the present invention but it will be appreciated that air is discharged from the cleaner by two ducts 30 and 32 (FIGURE 4) to the carburetion system of the engine. A main blower housing or shroud 34 is mounted on the top of the engine and it is adapted to receive air discharged from a main blower rotor 36 which is driven by a belt 38. Details regarding the main blower are disclosed in the patent application Serial No. 843,736 above referred to.

Duct work extends from the discharge side or shroud 34 of the main blower to an inlet chamber 40 located above the horizontal portion 24 of the partition 22. This duct work includes two branches each of which leads from the main blower by way of a bank of engine cylinders to the inlet chamber 40 and includes a casing 42 enclosing the corresponding bank of three cylinders 44. It also includes a conduit 46 leading through the partition 22 to a duct 48 which in turn leads to the forward end of the inlet chamber 40. Added duct work in the form of a third branch leads from the casing 34 on the discharge side of the main blower to the rear end of the inlet chamber 40 and includes a fitting 50 and a conduit 52.

An auxiliary or second blower 54 is mounted with its axis vertical and it is positioned between the inlet chamber 40 and the horizontal shelf portion 24. This second blower has an inlet port 56, a bladed rotor 58 and a motor 60. The port 56 communicates with the inlet chamber 40 to receive air from the latter. A discharge port 62 leads from the second blower 54 to a distributor manifold 64 located in the passenger compartment 14. Each end of the manifold 54 is provided with an L-shaped duct 66 having a grill outlet 68 immediately above the floor 70 of the vehicle and beneath the front edge of the rear seat 26. Each duct 66 has a side outlet 70 (FIGURE 2) to which is connected one of two defroster conduits 72. Each of these is provided with a grill outlet 74 for heating or ventilating the front portion of the passenger compartment 14 and it is also connected by means of an extension conduit 76 to a nozzle 80 directed at the windshield 12. Each conduit 72 and outlet 74 is located within a channel formed integral with the body.

Two dampers are installed in the inlet chamber 40. One of these dampers is seen at 82 and is adapted to be operated by a crank 84 (FIGURE 4) to control the direct flow of air from the main blower to the second blower 54. Another damper 86 is mounted immediately above the port 56 of the second blower 54 and is adapted to be operated by a crank 89 to two extreme positions as shown in FIGURE 3 or to an intermediate position.

Beneath each bank of cylinders 44 and within the corresponding casing 42 is located a bracket 90 (FIGURE 5) which supports a bellows type thermo-sensitive motor 92. One end of the bellows is fixed as at 94 to the bracket. The other end of the bellows is free to move depending upon the temperature within the chamber 42 as will be understood. A rod 96 is slidably mounted within a free end 98 of the bracket 90 with one end attached to the movable end of the bellows 92. The other end of the rod 96 is pivoted as at 100 to a bracket 102 fixed to the forward side of a damper 104. The latter is pivoted at 106 to the walls of the casing 42 and is positioned to control a port 108 leading to the atmosphere. The arrangement of the damper 104 is such that it opens in a clockwise direction as viewed in FIGURE 5 and about the pivot 106. Its movement is assisted by a spring 110. It will be appreciated that a damper 104 with a thermo-sensitive motor 92 is utilized for each bank of three cylinders on the engine 20.

In operation of the system and assuming the heat is required in the passenger compartment and the engine is running at normal temperature, the damper 86 will be placed in its dot-and-dash position as shown in FIGURE 3. At this time it is immaterial what position is given the damper 82.

If the engine is operating at its proper temperature, that is, not in excess of optimum operating temperature, each damper 104 will be closed. Under such circumstances, air from the main blower will pass downwardly into heat exchange relation with each bank of three cylinders 44 and be heated thereby. This air will flow upwardly through the twin conduits 46 and be admitted to opposite sides of the forward end of the inlet chamber 40. The damper 86 will then guide the heated air downwardly to the port 56 for distribution by way of the blower 54, the manifold 64 and its associated conduits to the passenger compartment 14.

Assuming, however, that heat is not required but ventilation is desired, then the dampers 86 and 82 will be placed in their full line positions as shown in FIGURE 3. Under such circumstances, air from the engine compartment will be forced by the main blower directly to the port 56 (FIGURE 3) and from there into the passenger compartment to ventilate the latter. This air, being derived from the engine compartment 16, will often be conducive to increased passenger comfort as it is slightly warmer than ambient air.

It will be appreicated that the damper 86 may be placed into an intermediate position to modify the heat supplied to the passenger compartment in accordance with requirements—i.e.—air from conduits 52 and 46 may be mixed. It will also be appreciated that if no air is desired to be forced into the passenger compartment, the damper 82 will be placed in its closed or dot-and-dash line position and the damper 86 will be placed in its full line position as shown in FIGURE 3.

In the event that the temperature of the air within a casing 42 becomes excessive for optimum engine operating conditions, then the bellows 92 of one or both cylinder banks will expand and cause discharge of the air from the fins of the cylinders directly into the atmosphere until the temperature within the chamber or chambers 42 is reduced the requisite amount. In this way, the efficiency of the engine is retained and the heating system is assured of an adequate supply of heat.

The spring 110 for each damper 104 constitutes a "fail safe" device operative in the event the corresponding bellows motor 92 should rupture or somehow become disconnected from the damper. In such an event the spring would open the damper and no overheating of the engine will occur.

We claim:

1. A heating and ventilating system in an automobile having a passenger compartment and an air-cooled engine with a finned cylinder in an engine compartment, duct work enclosing said cylinder, a blower with its discharge connected to said duct work for directing cooling air toward, around and away from the said cylinder, a vent port in a wall of said duct work downstream from said cylinder, a damper arranged to control said vent port, a heater duct connected at one end to an interior zone of said duct work downstream from said cylinder and at its other end to said passenger compartment, and temperature sensitive means in said duct work and operatively connected to said damper for actuating the latter into its open position when the temperature of said cooling air exceeds a predetermined value thereby insuring adequate heat for said passenger compartment during cold weather and avoiding excessive heating of said finned cylinder.

2. A heating and ventilating system in an automobile having a passenger compartment and an air-cooled engine with a bank of finned cylinders in an engine compartment, a main blower located in said engine compartment, said main blower having its discharge directed at said bank for cooling the latter with air, first duct work arranged to guide said cooling air around and in contact with said bank and then to said passenger compartment, automatic means for controlling the temperature of said engine during changes in engine load and speed, a second blower in said duct work, further duct work connecting said main blower to said first duct work and bypassing said bank, damper means controlling the flow of air through said first and further duct work, and the arrangement being such that said blowers are adapted to act in series for ventilating said compartment with air bypassing said bank and also in series for heating of said compartment with air flowing from said bank.

3. A heating and ventilating system in an automobile having a passenger compartment and an air cooled engine in an engine compartment, a main blower with a discharge for engine cooling air connected to said engine, main duct work arranged to guide said cooling air from said engine to said passenger compartment, engine bypass duct work connecting said main blower to said main duct work downstream from said engine, a second blower in said main duct work downstream from said engine bypass duct work, damper means controlling the flow through said main and bypass duct work, a vent port in a wall of a portion of said main duct work between said engine and said damper means, a vent damper arranged to control said vent port, temperature sensitive means in said portion and operatively connected to said vent damper to open the latter when the temperature of said engine exceeds that of optimum engine operating conditions, and the arrangement being such that air flowing directly from said main blower through said bypass duct work may be mixed with air heated by said engine and forced into said passenger compartment by action of said second blower.

References Cited in the file of this patent

UNITED STATES PATENTS

| | | |
|---|---|---|
| 1,282,590 | Kernohan | Oct. 22, 1918 |
| 1,930,508 | Conant | Oct. 17, 1933 |
| 1,977,538 | Anderson | Oct. 16, 1934 |
| 2,015,960 | Norris | Oct. 1, 1935 |
| 2,573,544 | Colby | Oct. 30, 1951 |
| 2,664,862 | Walker | Jan. 5, 1954 |
| 2,722,404 | Koff | Nov. 1, 1955 |
| 2,876,998 | Csabi | Mar. 10, 1959 |

FOREIGN PATENTS

| | | |
|---|---|---|
| 469,648 | Great Britain | July 29, 1937 |